US007777712B2

(12) United States Patent
Chang

(10) Patent No.: US 7,777,712 B2
(45) Date of Patent: Aug. 17, 2010

(54) LEVEL SHIFT CIRCUIT AND DISPLAY USING SAME

(75) Inventor: Yu-Jui Chang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 792 days.

(21) Appl. No.: 11/550,014

(22) Filed: Oct. 17, 2006

(65) Prior Publication Data

US 2008/0088565 A1 Apr. 17, 2008

(51) Int. Cl.
*G09G 3/36* (2006.01)
*G06F 3/038* (2006.01)

(52) U.S. Cl. ........................ 345/100; 345/204; 345/211

(58) Field of Classification Search ......... 345/211–214, 345/204, 98–100, 208–210; 323/314; 327/333; 330/253–255
See application file for complete search history.

(56) References Cited

U.S. PATENT DOCUMENTS

| | | | | |
|---|---|---|---|---|
| 6,909,417 | B2 * | 6/2005 | Washio et al. | |
| 7,005,908 | B2 * | 2/2006 | Lee et al. | 327/333 |
| 7,019,578 | B2 * | 3/2006 | Koto | 327/333 |
| 7,061,299 | B2 * | 6/2006 | Khan et al. | 327/333 |
| 7,324,097 | B2 * | 1/2008 | Koyama et al. | 345/204 |

* cited by examiner

*Primary Examiner*—Bipin Shalwala
*Assistant Examiner*—Sosina Abebe

(57) ABSTRACT

The level shift circuit and the display using same are disclosed. The level shift circuit includes a shift logic circuit and a logic controller. The shift logic circuit is capable of shifting a level of an input signal. The logic controller is capable of resetting the shift logic circuit before the shift logic circuit shifting the level of the input signal, and then enabling the shift logic circuit to shift the level of the input signal.

17 Claims, 4 Drawing Sheets

LEVEL SHIFT CIRCUIT AND DISPLAY USING SAME

BACKGROUND

1. Field of Invention

The present invention relates to a display, and particularly to a level shift circuit of the source driver in the display.

2. Description of Related Art

Level shift circuits are utilized in integrated circuits for shifting the voltage levels of the input signals to provide the output signals having the higher output voltage levels.

FIG. 1 is a circuit diagram depicting a level shift circuit 100 of the prior art. The level shift circuit 100 has a first P-type transistor 110, a second P-type transistor 120, a first N-type transistor 130, and a second N-type transistor 140. The level shift circuit 100 receives complementary input signals from input terminals IN1 and IN2 and converts the input signals into output signals for outputting to output terminals OUT1 and OUT2.

The first P-type transistor 110 has a source connected to a power source VDDA, a gate connected to the first output terminal IN1, a drain connected to the second output terminal OUT2. The second P-type transistor 120 has a source connected to the power source VDDA, a gate connected to the second output terminal OUT2, a drain connected to the first output terminal OUT1.

The first N-type transistor 130 has a source connected to a second supply voltage VSSA, a gate connected to a first input terminal IN1, a drain connected to the second output terminal OUT2. The second N-type transistor 140 has a source connected to the second supply voltage VSSA, a gate connected to a second input terminal IN2, a drain connected to the first output terminal OUT1.

Due to the gate of the first P-type transistor 110 is connected to the drain of the second N-type transistor 140, and the gate of the second P-type transistor 120 is connected to the drain of the first N-type transistor 130, therefore, if the first input signal IN1 is high and the second input signal IN2 is low, then the first N-type transistor 130 is turned on and the second N-type transistor 140 is turned off, which results in OUT1 coupling to the VDDA and OUT2 coupling to the VSSA. If the first input signal IN1 is low and the second input signal IN2 is high, then the first N-type transistor 130 is turned off and the second N-type transistor 140 is turned on, which results in OUT1 coupling to the VSSA and OUT2 coupling to the VDDA.

However, the above-mentioned conventional level shift circuit 100 has a drawback of a longer transitional time when the input voltage (for example, IN1 or IN2) is too small. For example, when the first input terminal IN1 of the first N-type transistor 130 is at logic high of 2V, the first N-type transistor 130 is slowly turned on, and the first P-type transistor 110 is gradually turned off. In this transitional time, the first P-type transistor 110 and the first N-type transistor 130 are possible to be turned on at the same time such that a leaking current is generated and power is wasted.

SUMMARY

Therefore, it is an object of the invention to provide an improved level shift circuit.

According to the object of the present invention, a level shift circuit is provided that includes a shift logic circuit and a logic controller. The shift logic circuit is capable of shifting a level of an input signal. The logic controller is capable of resetting the shift logic circuit before the shift logic circuit shifting the level of the input signal, and then enabling the shift logic circuit to shift the level of the input signal.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
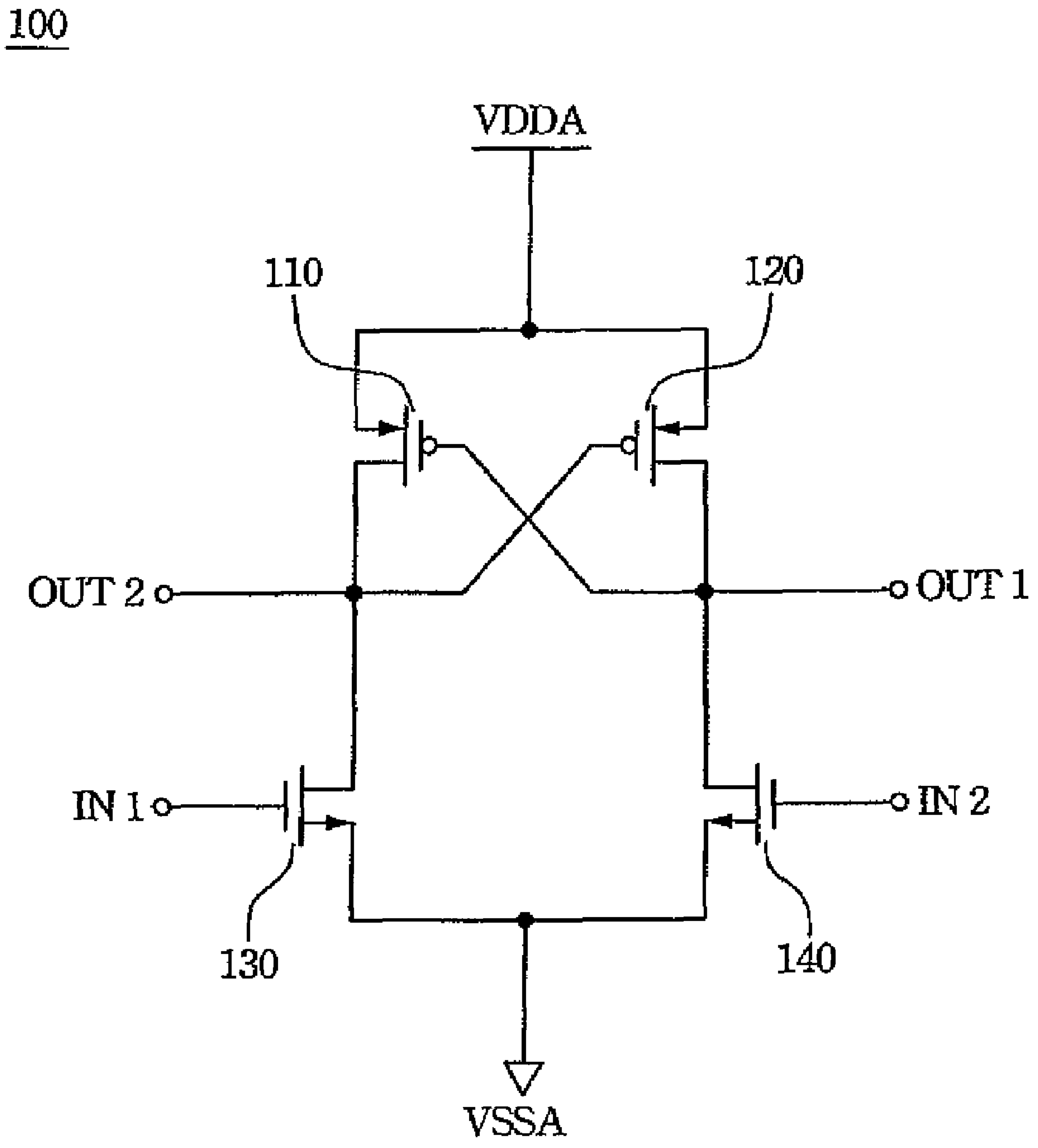
Fig. 1 (PRIOR ART)
FIG. 1 is a circuit diagram depicting a level shift circuit of the prior art.

Reference will now be made in detail to the present preferred embodiments of the invention, examples of which are illustrated in the accompanying drawings. Wherever possible, the same reference numbers are used in the drawings and the description to refer to the same or like parts.

Figure 2:
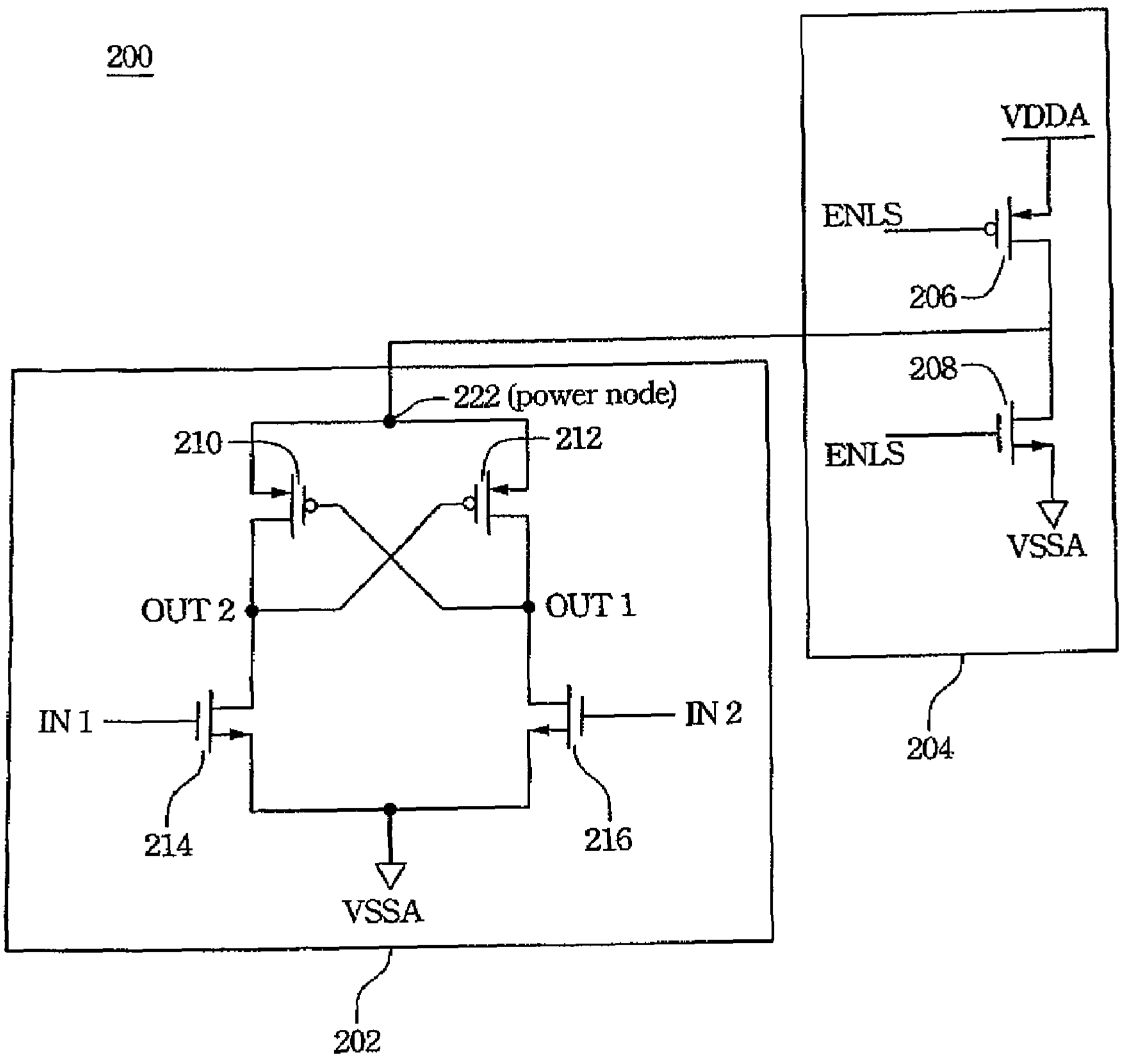
FIG. 2 is a circuit diagram depicting a level shift circuit of one embodiment of the present invention.

FIG. 2 is a circuit diagram depicting a level shift circuit 200 of one embodiment of the present invention. A level shift circuit 200 includes a shift logic circuit 202 and a logic controller 204. The shift logic circuit 202 is capable of receiving input signals and shifting the level of the input signals to generate corresponding high-voltage output signals. The shift logic circuit 202 has a power node 222 connected to the logical controller 204. The logic controller 204 is controlled by an enabling signal ENLS to deliver either a first supply voltage VDDA or a second supply voltage VSSA to the shift logic circuit 202. The first supply voltage VDDA is higher than the second supply voltage VSSA.

While the level shift circuit 200 is in a operation mode, the logic controller 204 outputs the first supply voltage VDDA to the shift logic circuit 202; while the level shift circuit 200 is in a reset mode, the logic controller 204 outputs the second supply voltage VSSA to the shift logic circuit 202. The level shift circuit 200 is reset before level-shifting new input signals so as to discharge the output terminals OUT1 and OUT2 to the second supply voltage VSSA and thus the transition time for level-shifting the new input signals is shortened.

The logic controller 204 includes a first P-type transistor 206 and a first N-type transistor 208. The first P-type transistor 206 has a source connected to the first supply voltage VDDA, a drain connected to the power node 222 of the shift logic circuit 202, a gate connected to the enabling signal ENLS. The first N-type transistor 208 has a drain connected to the power node 222 of a shift logic circuit 202, a source connected to a second supply voltage VSSA, and a gate for receiving the enabling signal ENLS.

The shift logic circuit 202 includes a second P-type transistor 210, a third P-type transistor 212, a second N-type transistor 214, and a third N-type transistor 216. The second P-type transistor 210 has a source connected to the power node 222, a gate connected to the first output terminal OUT1, and a drain connected to the second output terminal OUT2. The third P-type transistor 212 has a source connected to the power node 222, a gate connected to the second output terminal OUT2, and a drain connected to the first output terminal OUT1. The second N-type transistor 214 has a drain connected to the second output terminal OUT2, a gate connected to a first input terminal IN1, and a source connected to the second supply voltage VSSA. The third N-type transistor 216 has a drain connected to the first output terminal OUT1, a gate connected to a second input terminal IN2, and a source connected to the second supply voltage VSSA. The first supply voltage VDDA is higher than the second supply voltage VSSA.

An operation of the level shift circuit 200 of one embodiment of the present invention is disclosed as follows. Initially, assume that the level shift circuit 200 is currently in a stable state with input signal IN1 at the high level, and input signal IN2 at the low level, and the logical controller 204 provides the first supply voltage VDDA to the power node 222 as the operational power for the shift logic circuit 202. Consequently, the second N-type transistor 214 is turned on such that the output terminal OUT2 is pulled low; the third N-type transistor 216 is turned off such that the output terminal OUT1 is pulled high. The output signals of the shift logic circuit 202 is thus generated at the output terminals OUT1 and OUT2.

Next, before level-shifting new input signals, the shift logic circuit 202 should be reset. For resetting shift logic circuit 202, the enabling signal ENLS is set to high such that the power node 222 is pulled down to the second supply voltage VSSA. At this time, the first output terminal OUT1 begins to discharge and then both output terminals OUT1 and OUT2 are pulled down to the second supply voltage VSSA.

After reset of the shift logic circuit 202, the enabling signal ENLS is pulled low to supply the first supply voltage VDDA to the shift logic circuit 202 for level-shifting new input signals. Assume that the input signals at input terminals IN1 and IN2 are at the low level and at the high level respectively, opposite to the previous input signals. The new input signals then cause the output terminal OUT2 to be pulled toward the first supply voltage VDDA and remain the output terminal OUT1 at the secondary supply voltage VSSA. The output terminal OUT1 is pulled low in advance before transition such that the transition time for the new input signals is reduced and thus the power waste during transition is reduced.

Figure 3A:
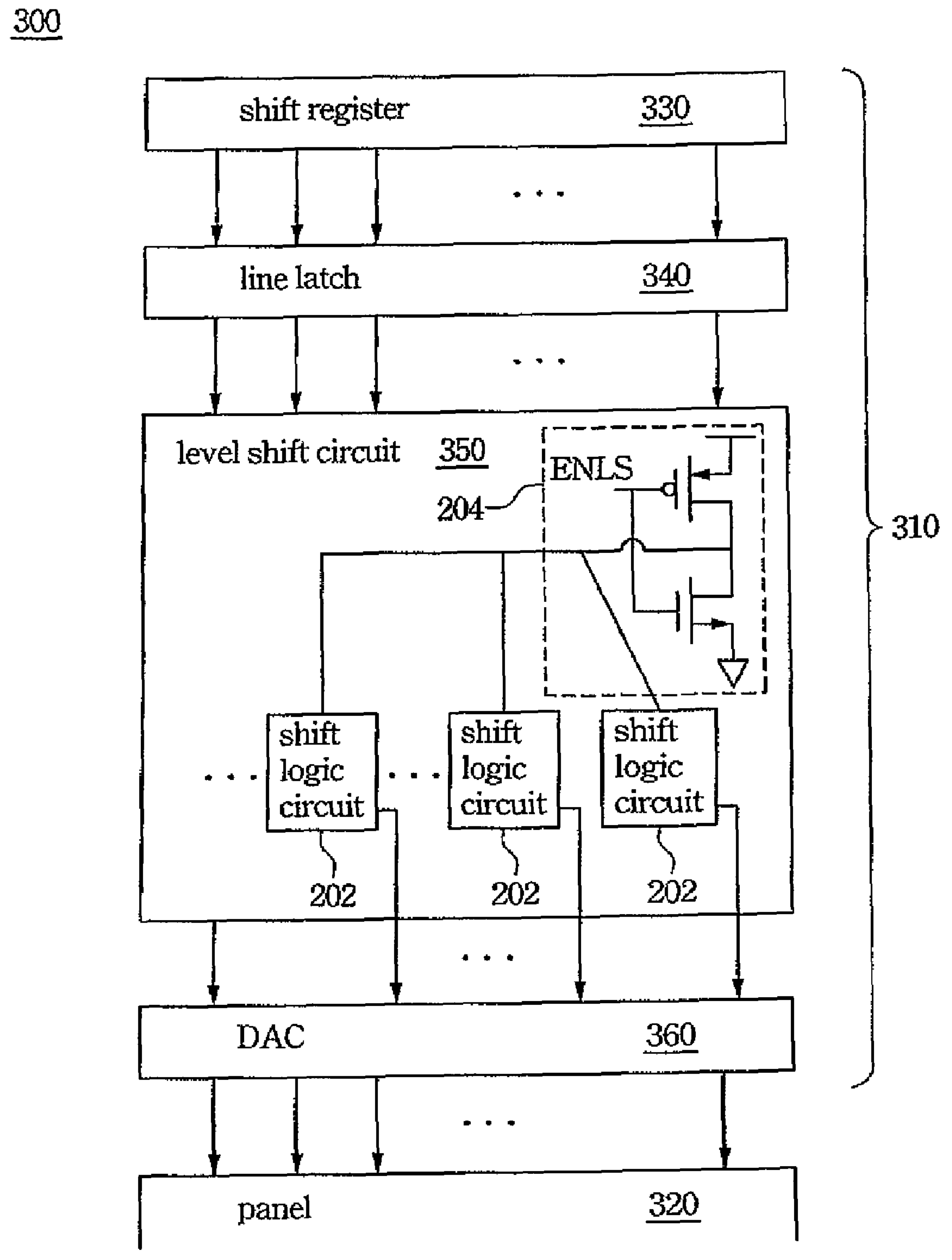
FIG. 3A. is a block diagram of a display panel of another embodiment of the present invention.

FIG. 3A. is a block diagram of a display panel according to another embodiment of the invention. The display panel 300 includes a panel 320 and a source driving circuit 310. The source driving circuit 310 includes a shift register 330, a line latch 340, a level shift circuit 350 and a digital-to-analog converter (DAC) 360. The shift register 330 controls the line latch 340 to receive and latch image data. The level shift circuit 350 includes a plurality of shift logic circuits 202; each shift logic circuit 202 is responsible for 1 bit of the image data. The level shift circuit 350 may include one or more logic controller 204, each logic controller 204 may be responsible for one or more shift logic circuit 202 depending on the practical circuit design considerations. The level shift circuit 350 receives the input signals from the line latch 340. The outputs of the level shift circuit 350 are then input to the digital-to-analog converter (DAC) 360 for driving panel 320. The enabling signal ENLS for the logic controller 204 may be generated according to the activation signal that the line latch 340 used to start inputting to level shift circuit 350.

Figure 3B:
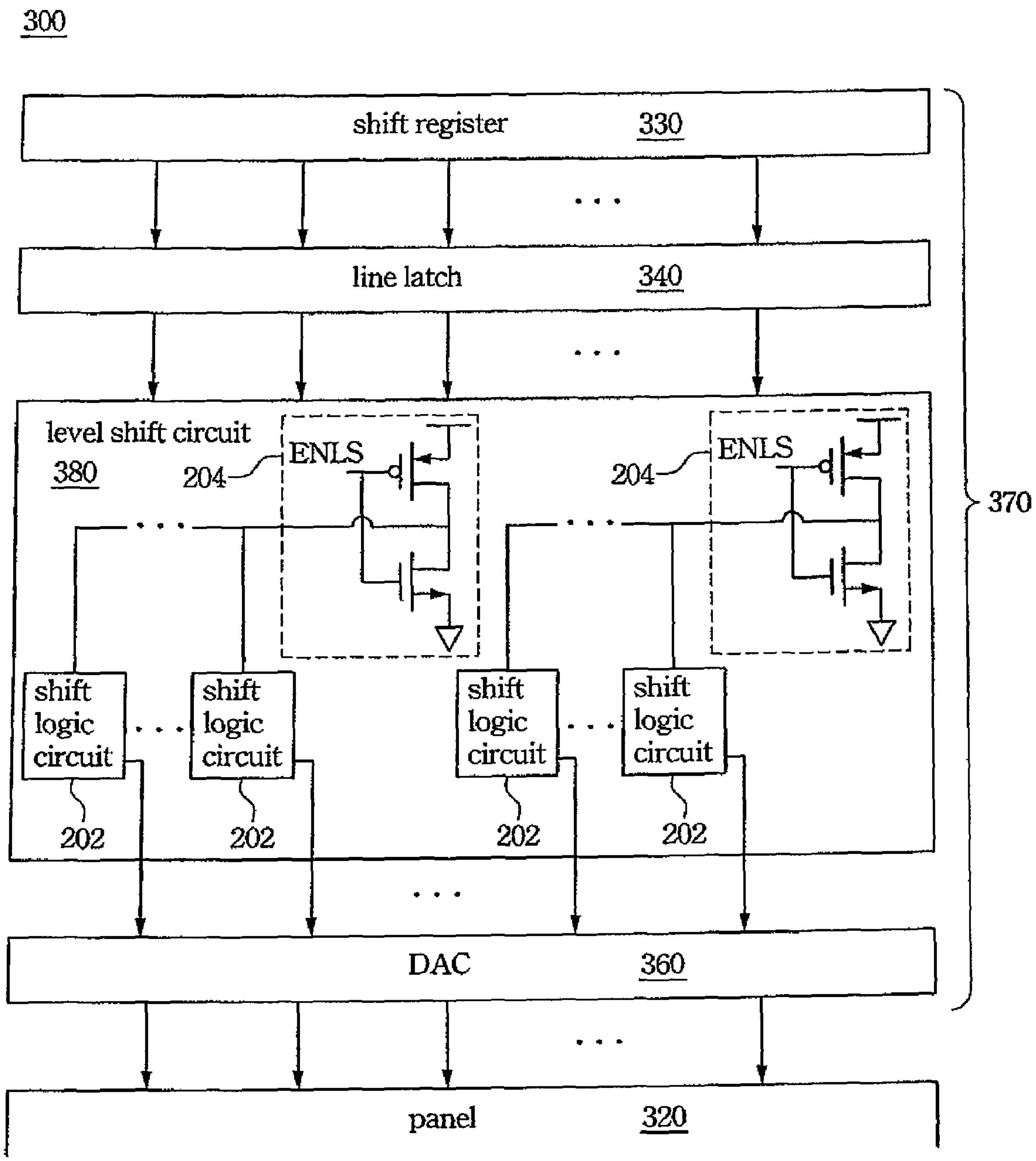
FIG. 3B. is a block diagram of a display panel of another embodiment of the invention.

FIG. 3B. is a block diagram of a display panel according to another embodiment of the invention. The display panel 300 includes a panel 320 and a source driving circuit 370. The source driving circuit 370 includes a shift register 330, a line latch 340, a level shift circuit 380 and a digital-to-analog converter (DAC) 360. The shift register 330 controls the line latch 340 to receive and latch image data. The level shift circuit 380 includes a plurality of shift logic circuits 202; each shift logic circuit 202 is responsible for 1 bit of the image data. The level shift circuit 380 differs from the level shift circuit 350 in that it includes more logic controllers 204, each logic controller 204 may be responsible for one or more shift logic circuit 202 depending on the practical circuit design considerations. The level shift circuit 380 receives the input signals from the line latch 340. The outputs of the level shift circuit 380 are then input to the digital-to-analog converter (DAC) 360 for driving panel 320. The enabling signal ENLS for the logic controllers 204 may be generated according to the activation signal that the line latch 340 used to start inputting to level shift circuit 350.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A level shift circuit, comprising:

a shift logic circuit for shifting levels of input signals; and a logic controller for discharging an output terminal of the shift logic circuit after the shift logic circuit shifting a level of one of the input signals and before the shift logic circuit shifting the level of a next of the input signals such that the output terminal of the shift logic circuit remains pulled low and transition time of the shift logic circuit changing to shift the next of the input signals is reduced when the shift logic circuit is to shift the level of the next of the input signals, and then for enabling the shift logic circuit to shift the level of the next of the input signals.

2. The level shift circuit according to claim 1, wherein while enabling, the logic controller provides a first supply voltage to a power node of the shift logic circuit, and while resetting, the logic controller provides a second supply voltage to the power node, wherein the second supply voltage is lower than the first supply voltage.

3. The level shift circuit according to claim 1, wherein the logic controller comprises:

a first switch connected between a first supply voltage and a power node of the shift logic circuit; and a second switch connected between a second supply voltage and the power node of the shift logic circuit, the second supply voltage is lower than the first supply voltage;

wherein while resetting, the second switch is turned on, and while enabling, the first switch is turned on.

4. The level shift circuit according to claim 3, wherein the first switch comprises a first P-type transistor having a source connected to the first supply voltage, a drain connected to the power node of the shift logic circuit and a gate controlled by an enabling signal;

wherein the second switch comprises a first N-type transistor having a gate controlled by the enabling signal, a drain connected to the power node of the shift logic circuit, and a source connected to the second supply voltage.

5. The level shift circuit according to claim 1, wherein the shift logic circuit further comprises:

a second P-type transistor, having a source connected to the power node, a drain connected to a second output terminal, and a gate connected to a first output terminal;

a second N-type transistor having a drain connected to the second output terminal, a gate connected to a first input terminal, and a source connected to the second supply voltage;

a third P-type transistor, having a source connected to the power node, a drain connected to the first output terminal, and a gate connected to the second output terminal; and a third N-type transistor having a drain connected to the first output terminal, a gate connected to a second input terminal, and a source connected to the second supply voltage;

wherein the first input terminal receives the input signal and the second input terminal receives an inverted signal of the input signal.

6. A source driving circuit, comprising:

a shift register;

a line latch controlled by the shift register for receiving image data; and a level shift circuit, comprising:

a shift logic circuit for shifting levels of input signals from the line latch;

a logic controller for discharging an output terminal of the shift logic circuit after the shift logic circuit shifting a level of one of the input signals and before the shift logic circuit shifting the level of a next of the input signals such that the output terminal of the shift logic circuit remains pulled low and transition time of the shift logic circuit changing to shift the next of the input signals is reduced when the shift logic circuit is to shift the level of the next of the input signals, and then for enabling the shift logic circuit to shift the level of the next of the input signals; and a digital-to-analog converter for converting the level-shifted signal into an analog signal.

7. The source driving circuit according to claim 6, wherein while enabling, the logic controller provides a first supply voltage to a power node of the shift logic circuit, and while resetting, the logic controller provides a second supply voltage to the power node, wherein the second supply voltage is lower than the first supply voltage.

8. The source driving circuit according to claim 6, wherein the logic controller resets or enables the shift logic circuit according to the line latch.

9. The source driving circuit according to claim 6, wherein the logic controller comprises:

a first switch connected between a first supply voltage and a power node of the shift logic circuit; and a second switch connected between a second supply voltage and the power node of the shift logic circuit, the second supply voltage is lower than the first supply voltage;

wherein while resetting, the second switch is turned on, and while enabling, the first switch is turned on.

10. The source driving circuit according to claim 9, wherein the first switch comprises a first P-type transistor having a source connected to the first supply voltage, a drain connected to the power node of the shift logic circuit and a gate controlled by an enabling signal;

wherein the second switch comprises a first N-type transistor having a gate controlled by the enabling signal, a drain connected to the power node of the shift logic circuit, and a source connected to the second supply voltage.

11. The source driving circuit according to claim 6, wherein the shift logic circuit further comprises:

a second P-type transistor, having a source connected to the power node, a drain connected to a second output terminal, and a gate connected to a first output terminal;

a second N-type transistor having a drain connected to the second output terminal, a gate connected to a first input terminal, and a source connected to the second supply voltage;

a third P-type transistor, having a source connected to the power node, a drain connected to the first output terminal, and a gate connected to the second output terminal; and a third N-type transistor having a drain connected to the first output terminal, a gate connected to a second input terminal, and a source connected to the second supply voltage;

wherein the first input terminal receives the input signal and the second input terminal receives an inverted signal of the input signal.

12. A display comprising:

a panel; and a source driving circuit comprising:

a level shift circuit comprising:

a shift logic circuit for shifting levels of input signals; and a logic controller for discharging an output terminal of the shift logic circuit after the shift logic circuit shifting the level of one of the input signals and before the shift logic circuit shifting the level of a next of the input signals such that the output terminal of the shift logic circuit remains pulled low and transition time of the shift logic circuit changing to shift the next of the input signals is reduced when the shift logic circuit is to shift the level of the next of the input signals, and then for enabling the shift logic circuit to shift the level of the next of the input signals; and a digital-to-analog converter for converting the level-shifted signal into an analog signal for driving the panel.

13. The display according to claim 12, wherein while enabling, the logic controller provides a first supply voltage to a power node of the shift logic circuit, and while resetting, the logic controller provides a second supply voltage to the power node, wherein the second supply voltage is lower than the first supply voltage.

14. The display according claim 12, wherein the logic controller resets or enables the shift logic circuit according to the line latch.

15. The display according to claim 12, wherein the logic controller comprises:

a first switch connected between a first supply voltage and a power node of the shift logic circuit; and a second switch connected between a second supply voltage and the power node of the shift logic circuit, the second supply voltage is lower than the first supply voltage;

wherein while resetting, the second switch is turned on, and while enabling, the first switch is turned on.

16. The display according to claim 15, wherein the first switch comprises a first P-type transistor having a source connected to the first supply voltage, a drain connected to the power node of the shift logic circuit and a gate controlled by an enabling signal;

wherein the second switch comprises a first N-type transistor having a gate controlled by the enabling signal, a drain connected to the power node of the shift logic circuit, and a source connected to the second supply voltage.

17. A level shift circuit, comprising:

a shift logic circuit having output terminals, the shift logic circuit configured for shifting levels of input signals and generating output signals with shifted levels at the output terminals; and a logic controller for providing a first supply voltage when the shift logic circuit shifting the level of one of the input signals and for discharging one of the output terminals of the shift logic circuit from the first supply voltage to a second supply voltage that is lower than the first supply voltage after the shift logic circuit shifting the level of the one of the input signals and before the shift logic circuit shifting the level of a next of the input signals such that the one of the output terminals of the shift logic circuit remains pulled low and transition time of the shift logic circuit changing to shift the next of the input signals is reduced when the shift logic circuit is to shift the level of the next of the input signals.

* * * * *